(12) United States Patent
Martinez

(10) Patent No.: US 6,639,509 B1
(45) Date of Patent: Oct. 28, 2003

(54) SYSTEM AND METHOD FOR COMMUNICATING WITH AN RFID TRANSPONDER WITH REDUCED NOISE AND INTERFERENCE

(75) Inventor: Rene D. Martinez, Ossining, NY (US)

(73) Assignee: Intermec IP Corp., Woodland Hills, CA (US)

(*) Notice: Subject to any disclaimer, the term of this patent is extended or adjusted under 35 U.S.C. 154(b) by 0 days.

(21) Appl. No.: 09/390,461

(22) Filed: Sep. 7, 1999

Related U.S. Application Data

(63) Continuation-in-part of application No. 09/268,901, filed on Mar. 16, 1999, now abandoned.
(60) Provisional application No. 60/109,345, filed on Nov. 20, 1998, provisional application No. 60/108,546, filed on Nov. 16, 1998, provisional application No. 60/107,631, filed on Nov. 9, 1998, provisional application No. 60/078,226, filed on Mar. 16, 1998, and provisional application No. 60/078,100, filed on Mar. 16, 1998.

(51) Int. Cl.[7] ................................................. G01V 3/00
(52) U.S. Cl. .................... 340/10.4; 340/10.1; 340/10.5; 342/42; 455/127
(58) Field of Search ............................. 340/10.4, 10.1, 340/572.1, 572.5, 572.4, 10.34, 10.54; 342/42; 455/127, 106, 70

(56) References Cited

U.S. PATENT DOCUMENTS

| | | |
|---|---|---|
| 4,075,632 A | 2/1978 | Baldwin et al. |
| 4,360,810 A | 11/1982 | Landt |
| 4,782,345 A | 11/1988 | Landt |

(List continued on next page.)

FOREIGN PATENT DOCUMENTS

| | | |
|---|---|---|
| EP | 0 294 963 | 12/1988 |
| EP | 0 646 983 | 4/1995 |
| WO | WO 98/16070 | 4/1998 |

OTHER PUBLICATIONS

"Multifunctional Credit Card Package" IBM Technical Disclosure Bulletin, vol. 38, No. 08, Aug. 1995, p. 17.

(List continued on next page.)

*Primary Examiner*—Daryl Pope
(74) *Attorney, Agent, or Firm*—O'Melveny & Myers LLP

(57) ABSTRACT

The RFID interrogator further comprises a microcontroller module adapted to provide high level commands to the interrogator, a DSP module for processing received/transmitted data and controlling radio operations, and a radio module for transmitting and receiving RF signals to/from an RFID transponder. A first embodiment of the RFID interrogator comprises an RF carrier source providing a carrier signal, a processor providing an information signal, and plural modulation stages coupled to the RF carrier source for modulating the information signal onto the carrier signal using on/off keying modulation. The plural modulation stages are controlled in unison by control signals the said processor. The plural modulation stages provide dynamic range of greater than 25 dB between respective on and off states of the modulated signal. A second embodiment of the RFID interrogator comprises an RF carrier source providing a carrier signal, a modulator receiving the carrier source and modulating an information signal thereon to provide a modulated RF signal, and an amplification stage coupled to the modulator. The amplification stage splits the modulated RF signal into first and second components, and amplifies the first and second components separately. The first and second components are thereafter recombined. The split operation of the amplification stage provides a better match with the downstream transmission path than an individual amplifier. A third embodiment of the RFID interrogator comprises an RF carrier source providing a carrier signal, a demodulator combining a received signal with the RF carrier to provide a baseband signal, and an attenuator coupled to the demodulator for absorbing high frequency components of the baseband signal. The baseband signal further comprises in phase (I) and quadrature phase (Q) components. The high frequency components of the baseband signal pass through the high-pass filter to the resistor termination, where they are absorbed.

42 Claims, 4 Drawing Sheets

U.S. PATENT DOCUMENTS

| | | | |
|---|---|---|---|
| 4,786,907 A | | 11/1988 | Koelle |
| 4,816,389 A | | 3/1989 | Sansonetti et al. |
| 4,835,377 A | | 5/1989 | Brown |
| 4,853,705 A | | 8/1989 | Landt |
| 4,864,158 A | | 9/1989 | Koelle et al. |
| 4,888,591 A | | 12/1989 | Landt et al. |
| 4,999,636 A | | 3/1991 | Landt et al. |
| 5,030,807 A | | 7/1991 | Landt et al. |
| 5,055,659 A | | 10/1991 | Hendrick et al. |
| 5,347,280 A | * | 9/1994 | Schuermann ............... 342/42 |
| 5,479,160 A | | 12/1995 | Koelle |
| 5,485,520 A | | 1/1996 | Chaum et al. |
| 5,504,485 A | | 4/1996 | Landt et al. |
| 5,510,795 A | | 4/1996 | Koelle |
| 5,521,601 A | | 5/1996 | Kandlur et al. |
| 5,528,222 A | | 6/1996 | Moskowitz et al. |
| 5,538,803 A | | 7/1996 | Gambino et al. |
| 5,550,547 A | | 8/1996 | Chan et al. |
| 5,552,778 A | | 9/1996 | Schrott et al. |
| 5,554,974 A | | 9/1996 | Brady et al. |
| 5,563,583 A | | 10/1996 | Brady et al. |
| 5,565,847 A | | 10/1996 | Gambino et al. |
| 5,606,323 A | | 2/1997 | Heinrich et al. |
| 5,635,693 A | | 6/1997 | Benson et al. |
| 5,673,037 A | | 9/1997 | Cesar et al. |
| 5,680,106 A | | 10/1997 | Schrott et al. |
| 5,682,143 A | | 10/1997 | Brady et al. |
| 5,729,201 A | | 3/1998 | Jahnes et al. |
| 5,736,929 A | | 4/1998 | Schrott et al. |
| 5,737,710 A | | 4/1998 | Anthonyson |
| 5,739,754 A | | 4/1998 | Schrott et al. |
| 5,767,789 A | | 6/1998 | Afzali-Ardakani et al. |
| 5,771,021 A | | 6/1998 | Veghte et al. |
| 5,777,561 A | | 7/1998 | Chieu et al. |
| 5,786,626 A | | 7/1998 | Brady et al. |
| 5,812,065 A | | 9/1998 | Schrott et al. |
| 5,821,859 A | | 10/1998 | Schrott et al. |
| 5,825,329 A | | 10/1998 | Veghte et al. |
| 5,826,328 A | | 10/1998 | Brady et al. |
| 5,828,318 A | | 10/1998 | Cesar |
| 5,828,693 A | | 10/1998 | Mays et al. |
| 5,831,532 A | | 11/1998 | Gambino et al. |
| 5,850,181 A | | 12/1998 | Heinrich et al. |
| 5,850,187 A | | 12/1998 | Carrender et al. |
| 5,874,902 A | | 2/1999 | Heinrich et al. |
| 5,896,060 A | * | 4/1999 | Ovard et al. ............... 329/304 |
| 6,184,841 B1 | * | 2/2001 | Shober et al. ............... 343/853 |

OTHER PUBLICATIONS

As "A Low–Power CMOS Integrated Circuit for Field–Powered Radio Frequency Identification Tag" By Friedman et al., 1997 IEEE International Solid State Circuits Conference, PAper SA 17.5, pp. 294, 295, 474.

* cited by examiner

FIG. 3A   L(t)   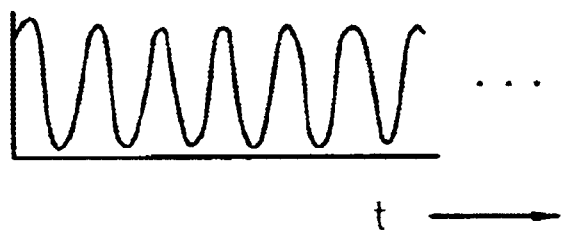
FIG. 3B   I(t)   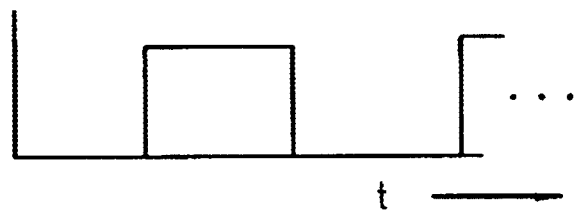
FIG. 3C   R(t)   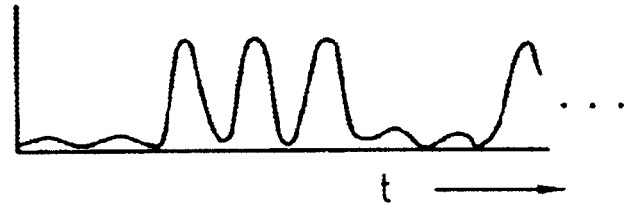
FIG. 3D   V(t)   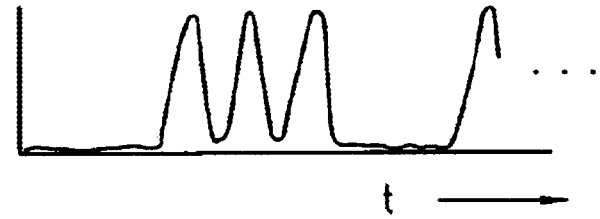

SYSTEM AND METHOD FOR COMMUNICATING WITH AN RFID TRANSPONDER WITH REDUCED NOISE AND INTERFERENCE

CROSS-REFERENCE TO RELATED APPLICATION

The present application is a continuation-in-part of U.S. patent application Ser. No. 09/268,901, filed Mar. 16, 1999, now abandoned, entitled "System And Method For RF Transmission To An RF Identification Transponder," which claims priority under 35 U.S.C. § 119(e) to the following U.S. provisional applications: (a) Ser. No. 60/078,100, filed Mar. 16, 1998, entitled "Transmitter Amplifier Saturation For Low Noise And/Or Power Control;" (b) Ser. No. 60/078,226, filed Mar. 16, 1998, entitled "Power Amplifier Balancing To Increase Output Matching And Noise Performance;" (c) Ser. No. 60/107,631, filed Nov. 9, 1998, entitled "Transmitter Amplifier Saturation For Low Noise And/Or Power Control;" (d) Ser. No. 60/108,546, filed Nov. 16, 1998, entitled "High On/Off Modulation Ratio By Cascading Modulation Components;" and (e) Ser. No. 60/109,345, filed Nov. 20, 1998, entitled "Termination Of I And Q Terminals For Low Noise Performance." The foregoing applications are incorporated by reference herein in their entirety.

BACKGROUND OF THE INVENTION

1. Field of the Invention

The present invention relates to radio frequency identification (RFID) interrogators and transponders, and more particularly, to a novel communication architecture for an RFID interrogator system.

2. Description of Related Art

In the automatic data identification industry, the use of RFID transponders (also known as RFID tags) has grown in prominence as a way to track data regarding an object to which the RFID transponder is affixed. An RFID transponder generally includes a semiconductor memory in which digital information may be stored, such as an electrically erasable, programmable read-only memory (EEPROMs) or similar electronic memory device. Under a technique referred to as "backscatter modulation," the RFID transponders transmit stored data by reflecting varying amounts of an electromagnetic field provided by an RFID interrogator by modifying their antenna matching impedances. The RFID transponders can therefore operate independently of the frequency of the energizing field, and as a result, the interrogator may operate at multiple frequencies so as to avoid radio frequency (RF) interference, such as utilizing frequency hopping spread spectrum modulation techniques. The RFID transponders may either extract their power from the electromagnetic field provided by the interrogator, or may include their own power source.

Since RFID transponders do not include a radio transceiver, they can be manufactured in very small, light weight and inexpensive units. RFID transponders that extract their power from the interrogating electromagnetic field are particularly cost effective since they lack a power source. In view of these advantages, RFID transponders can be used in many types of applications in which it is desirable to track information regarding a moving or inaccessible object. One such application is to affix RFID transponders to work pieces moving along a conveyor belt of an assembly line. The RFID transponders would contain stored information regarding the particular assembly requirements for the work piece to enable automated equipment to operate on the work piece and perform certain tasks particular to the unique work piece requirements. This way, products having different assembly requirements can be sent down the same assembly line without having to modify the assembly line for each unique requirement. Another application for RFID systems is to collect information from a moving motor vehicle, such as for vehicle toll collection.

The backscatter-modulated signal reflected by the RFID transponder may contain relatively low power and dynamic range. Therefore, it is important for the RFID interrogator to minimize the noise in both the transmitted and received signal paths in order to achieve an acceptable read range and error rate of the received data. The RFID interrogator transmits full power while receiving data in accordance with the backscatter modulation technique. As a result of the simultaneous transmitting and receiving, a portion of the transmitted signal can leak into the received signal path, providing a significant source of noise to the received signal. Moreover, there may be a small frequency offset between the transmitting and receiving signal frequencies, further producing noise and interference of the received signal. Another noise source comes from demodulator which mixes the received signal with the carrier frequency in order to downcovert the received signal to baseband or an intermediate frequency signal. The mixing stage can produce signal components that reflect back into the carrier, or that can produce absolute and/or additive phase noise.

Accordingly, it would be very desirable to provide an RFID interrogator having a receiver/transmitter architecture that attenuates these and other inherent noise sources in order to achieve increased read range and reduced error rate of the received data.

SUMMARY OF THE INVENTION

In accordance with the teachings of the present invention, an RFID interrogator is provided having a low-noise radio receiving/transmitting system. The RFID interrogator further comprises a microcontroller module adapted to provide high level commands to the interrogator, a DSP module for processing received/transmitted data and controlling radio operations, and a radio module for transmitting and receiving RF signals to/from an RFID transponder.

A first embodiment of the RFID interrogator comprises an RF carrier source providing a carrier signal, a processor providing an information signal, and plural modulation stages coupled to the RF carrier source for modulating the information signal onto the carrier signal using on/off keying modulation. The plural modulation stages are controlled in unison by control signals the said processor. A first one of the plural modulation stages comprises a mixer coupled to the RF carrier source and the processor. The mixer combines the carrier signal with the information signal to provide a modulated signal having on and off states in correspondence with the information signal. A second one of the plural modulation stages comprises an amplifier coupled to the mixer. The amplifier is responsive to control signals from the DSP to amplify the modulated signal only during on states of the modulated signal. A third one of the plural modulation stages comprises a switch having a first position coupled to a transmission path and a second position to a resistor termination. The switch is responsive to the control signals to couple the modulated signal to the transmission path during the on states of the modulated signal and to couple the modulated signal to the resistor termination during the off states of the modulated signal. The plural modulation stages provide dynamic range of greater than 25 dB between respective on and off states of the modulated signal.

A second embodiment of the RFID interrogator comprises an RF carrier source providing a carrier signal, a modulator receiving the carrier source and modulating an information signal thereon to provide a modulated RF signal, and an amplification stage coupled to the modulator. The amplification stage splits the modulated RF signal into first and second components, and amplifies the first and second components separately. The first and second components are thereafter recombined. The split operation of the amplification stage provides a better match with the downstream transmission path than an individual amplifier. More specifically, the amplification stage comprises a first quadrature hybrid adapted to split the modulated RF signal into the first and second components having a 90° phase difference therebetween, first and second power amplifiers receiving the first and second components respectively and providing amplification thereto, and a second quadrature hybrid adapted to recombine the amplified first and second components, respectively. The first and second quadrature hybrid further comprise respective isolated signal paths for communicating reflected power from the first and second power amplifiers therefrom, and resistor terminations coupled to the respective isolated signal paths. The first and second power amplifiers are each driven at a saturation level in order to minimize amplitude fluctuations that could leak into the receiver path.

A third embodiment of the RFID interrogator comprises an RF carrier source providing a carrier signal, a demodulator combining a received signal with the RF carrier to provide a baseband signal, and an attenuator coupled to the demodulator for absorbing high frequency components of the baseband signal. The baseband signal further comprises in phase (I) and quadrature phase (Q) components. The attenuator further comprises a high-pass filter and a resistor termination. The high frequency components of the baseband signal pass through the high-pass filter to the resistor termination, where they are absorbed. The RFID interrogator further comprises a circulator adapted to pass the carrier signal in a first direction therethrough and the received signal in a second direction therethrough opposite to the first direction. The circulator is coupled to the demodulator. A directional coupler is disposed closely adjacent to the circulator in order to minimize noise due to leakage by the circulator. The directional coupler passes the carrier signal to the demodulator.

A more complete understanding of the system and method for communication with an RFID transponder will be afforded to those skilled in the art, as well as a realization of additional advantages and objects thereof, by a consideration of the following detailed description of the preferred embodiment. Reference will be made to the appended sheets of drawings, which will first be described briefly.

BRIEF DESCRIPTION OF THE DRAWINGS

FIGS. 3A–3D illustrate waveforms for an RF carrier, an information signal, and modulated carrier signals;

DETAILED DESCRIPTION OF THE PREFERRED EMBODIMENT

The present application satisfies the need for an RFID interrogator having a receiver/transmitter architecture that attenuates certain inherent noise sources in order to achieve increased read range and reduced error rate of the received data. In the detailed description that follows, like element numerals are used to describe like elements illustrated in one or more of the figures.

Figure 1:
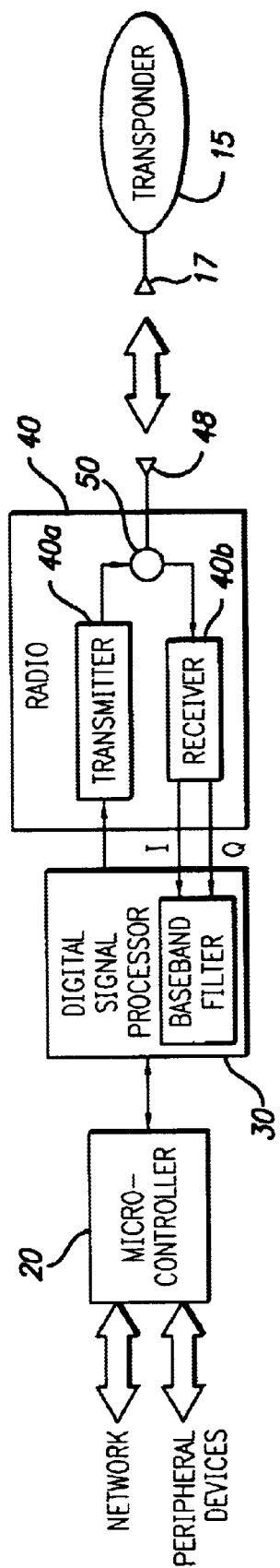
FIG. 1 is a block diagram illustrating an RFID interrogator and transponder.

Referring first to FIG. 1, an RFID interrogator 10 and tag 15 in accordance with the present invention are illustrated. The interrogator 10 comprises a microcontroller module 20, a digital signal processor (DSP) module 30, and a radio module 40. The microcontroller module 20 provides control over high level operation of the interrogator 10 and communicates with an external network and peripheral devices. The DSP module 30 provides direct control over all operations of the radio module 40 in response to high level commands provided by the microcontroller module 20, and processes data signals received from the tag 15. The radio module 40 provides for RF communications to/from the tag 15. The tag 15 is disposed in proximity to the interrogator 10, and has an antenna 17 that radiates an RF backscattered signal in response to an RF transmission signal provided by the interrogator. The tag 15 may either be powered from the modulated electromagnetic field provided by the interrogator 10, or may contain its own internal power source, such as a battery.

More particularly, the radio module 40 further comprises a transmitter portion 40a, a receiver portion 40b, a hybrid 50, and an antenna 48. The hybrid 50 may further comprise a circulator. The transmitter portion 40a includes a local oscillator that generates an RF carrier frequency. The transmitter portion 40a sends a transmission signal modulated by the RF carrier frequency to the hybrid 50, which in turn passes the signal to the antenna 48. The antenna 48 broadcasts the modulated signal and captures signals radiated by the tag 15. The antenna 48 then passes the captured signals back to the hybrid 50, which forwards the signals to the receiver portion 40b. The receiver portion 40b mixes the captured signals with the RF carrier frequency generated by the local oscillator to directly downconvert the captured signals to a baseband information signal. The baseband information signal comprises two components in quadrature, referred to as the I (in phase with respect to the transmitted carrier) and the Q (quadrature, 90° out of phase with respect to the carrier) signals. The hybrid 50 connects the transmitter 40a and receiver 40b portions to the antenna 48 while isolating them from each other. In particular, the hybrid 50 allows the antenna 48 to send out a strong signal from the transmitter portion 40a while simultaneously receiving a weak backscattered signal reflected from the transponder 15.

Figure 2:
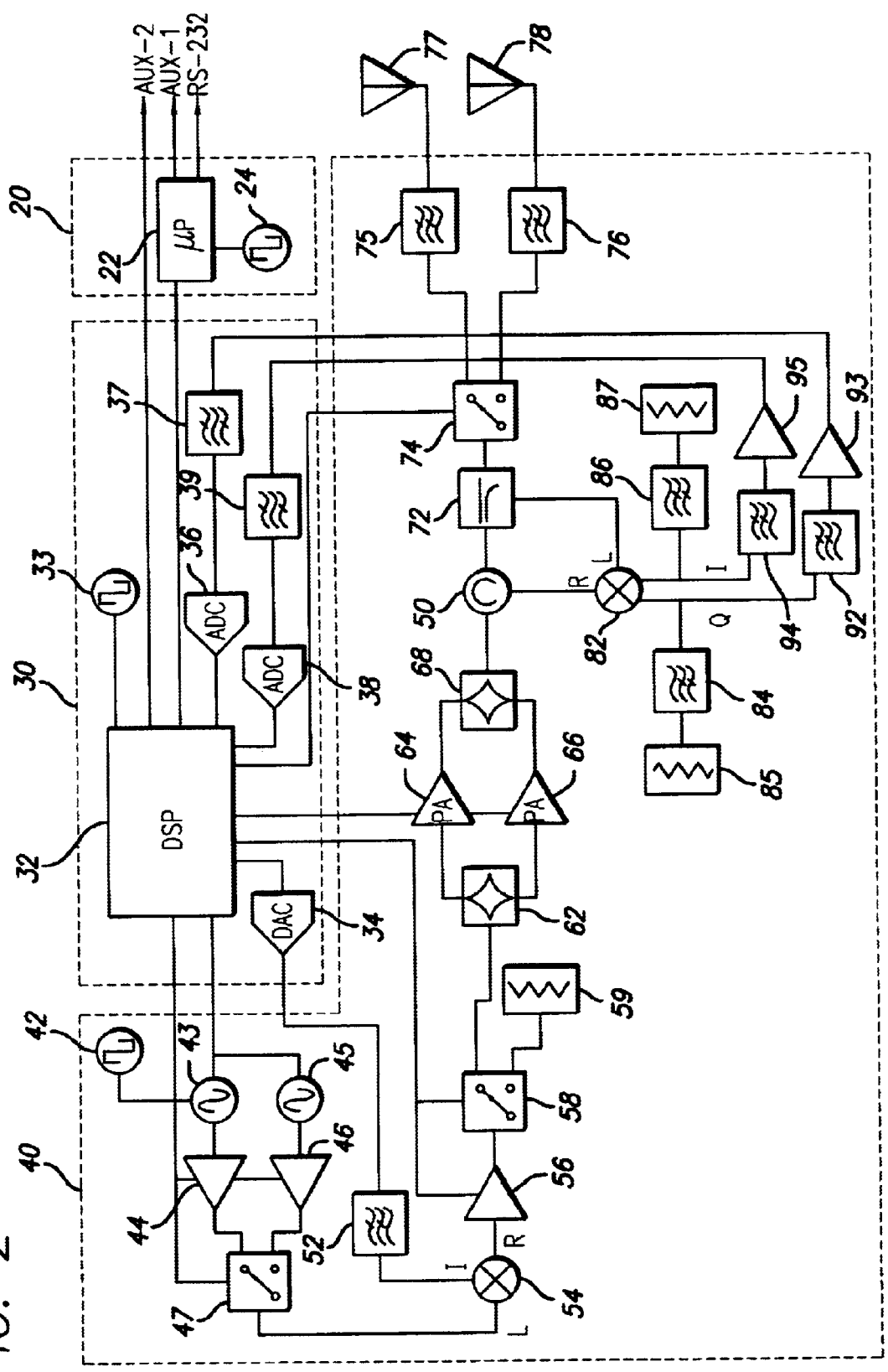
FIG. 2 is a block diagram of an embodiment of the RFID interrogator.

Referring now to FIG. 2, an exemplary embodiment of the RFID interrogator is illustrated in greater detail. The microcontroller module 20 comprises a microprocessor ($\mu$p) 22 and a clock source 24 providing a clock signal to the microprocessor. As described above, the microprocessor 22 supervises the high-level operation of the RFID interrogator. External application level command sequences are provided to the microprocessor 22 through a serial RS-232 port. The microprocessor 22 interprets these external commands and constructs a sequence of lower level commands for execution by the DSP module 30. The microprocessor 22 further includes an external interface (AUX_1) that permits another device, such as an infrared (IR) detector, to trigger the RFID interrogator to execute a command.

The DSP module 30 comprises a DSP 32, a clock source 33 providing a clock signal to the DSP, a digital-to-analog converter (DAC) 34, analog-to-digital converters (ADC) 36, 38, and band-pass filters 37, 39. As described above, the DSP 32 receives commands from the microprocessor 22 and controls the radio module 40. The DSP 32 includes an external interface (AUX_2) that may be used to permit another device to directly control the DSP, such as to disable operation of the radio module 40. The DSP 32 provides a digital data output signal to the DAC 34 for modulating a carrier to transmit signals to the RFID transponder, as will be further described below. Received I and Q signals from the radio module 40 pass through the respective band-pass filters 37, 39, and are converted to digital signals by the respective ADCs 36, 38. The bandpass filters 37, 39 may be provided by cascaded high-pass filters and low-pass filters. The DSP 32 processes the digitized and filtered I and Q signals to recover the bit clock and encoded data, and provide the recovered data to the microcontroller module 20.

The radio module 40 further comprises several subsystems, including an RF source subsystem, a modulator subsystem, an amplifier subsystem, a receiver subsystem, and an antenna connection subsystem. It should be appreciated that the RF source subsystem, the modulator subsystem and the amplifier subsystem correspond generally to the transmitter 40a of FIG. 1, and the receiver subsystem corresponds generally to the receiver 40b of FIG. 1. These subsystems of the radio module 40 are provided with various noise reducing features. Each of these subsystems and their noise reducing features are described in further detail below.

In the RF source subsystem, two synthesized phase locked loop (PLL) sources work together to provide a single RF carrier signal with a fast ($\leq 26$ μs) hopping time for frequency hopping spread spectrum operation. The RF source subsystem comprises a clock source 42, synthesized PLL sources 43, 45, amplifiers 44, 46, and switch 47. The clock source 42 provides a reference signal (e.g., 12 MHz) for the synthesized PLL sources 43, 45, and the DSP 32 programs the frequency channel of each PLL source into the desired band (e.g., 2.4 GHz). The amplifiers 44, 46 are connected to the PLL sources 43, 45, respectively, and provide buffering of the synthesizer outputs to prevent frequency pulling. The amplifiers 44, 46 are selectively enabled/disabled by control signals provided by the DSP 32. The switch 47 is controlled by the DSP 32 to select one of the synthesizer outputs to pass to the modulator subsystem (described below) as the RF carrier. A frequency hop sequence follows the steps of: 1) disabling the amplifier subsystem (described below); 2) selecting one of the synthesizers by operation of the switch 47; and 3) enabling the amplifier subsystem. The steps of disabling/enabling the amplifier subsystem prevents RF outputs from the RFID interrogator while in the process of hopping to a new channel.

The modulator subsystem modulates an information signal onto the selected RF carrier from the RF source subsystem using on-off key modulation, wherein full amplitude corresponds to an on state (e.g., logical one) and zero amplitude corresponds to an off state (e.g., logical zero). In an embodiment of the RFID interrogator, the modulator subsystem includes plural cascading modulation components in order to increase the dynamic range between the on and off states of the modulating signal. The dynamic range of any single stage may be limited by the leakage in the stage or the symmetry of devices in the stage. More particularly, the modulator subsystem comprises a low-pass filter 52, a mixer 54, an amplifier 56, a switch 58 and a resistor termination 59. The output from the DAC 34 controls the amplitude of the carrier, i.e., between the on and off states. The low-pass filter 52 attenuates modulated signals that have high offset frequencies ($\geq 1$ MHz) relative to the carrier. The mixer 54 has a local oscillator input (L), an intermediate frequency input (I), and an RF output (R). The carrier is coupled to the local oscillator input L and the low-pass filtered information signal from the DSP 32 is coupled to the intermediate frequency input I. The mixer 54 multiplies the carrier with the information signal to yield a modulated signal present at the RF output R.

Referring briefly to FIGS. 3A–3D, various waveforms are illustrated corresponding to the signals processed by the modulator subsystem. FIG. 3A illustrates the carrier L(t) provided by the RF source subsystem to the L input of the mixer 54. FIG. 3B illustrates the information signal from the DAC 34 into the I input of the mixer 54, in which the signal switches between on and off states in correspondence with the data contained in the transmitted information signal. FIG. 3C illustrates the combined carrier and information signal present at the output R, in which the amplitude of the carrier is modulated by the information signal. The mixer 54 provides a first stage of modulation having roughly 15–25 dB of dynamic range between the on and off states. A portion of the carrier leaks through the mixer 54 as shown in FIG. 3C by the presence of a low amplitude sinusoidal waveform at the off states.

To further increase the dynamic range of the modulated signal, the modulated signal passes through two subsequent modulation stages. Following the mixer 54, the modulated signal passes through the amplifier 56 and switch 58. Both of these elements are directly controlled by the DSP 32 in unison. During on states of the modulated signal, the amplifier 56 is energized by the DSP to amplify the modulated signal and the switch 58 passes the amplified modulated signal therethrough to the amplifier subsystem (described below). Conversely, during off states of the modulated signal, the amplifier 56 is shut off by the DSP and the switch 58 passes the residual signal that leaks past the amplifier into the resistor termination 59. The resistor termination 59 absorbs the residual leakage signal from the amplifier. By passing the modulated signal through plural modulation stages that are gated in unison, the dynamic range of the modulated signal between on and off states may be increased to as much as 50 dB. As shown in FIG. 3D, the modulated signal v(t) that passes to the transmitter amplifier subsystem contains an almost imperceptible amount of carrier leakage at the off states.

Figure 4:
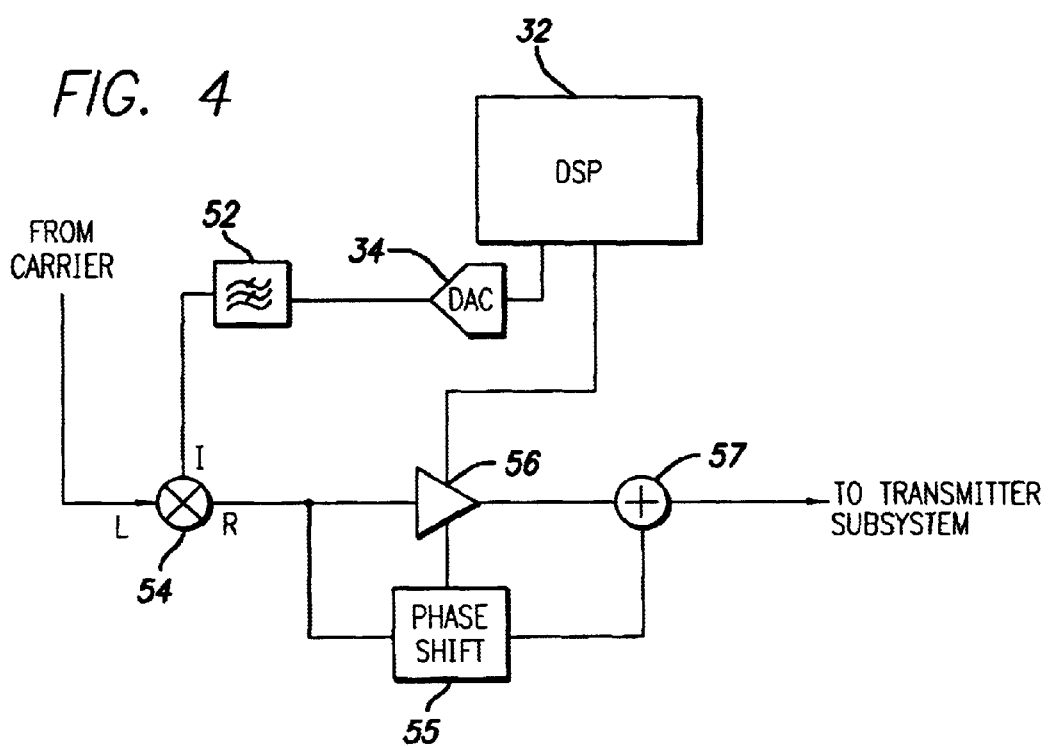
FIG. 4 is a block diagram of an alternative embodiment of the modulator subsystem of the RFID interrogator of FIG. 2.

An alternative embodiment of the modulator subsystem is illustrated in FIG. 4. The alternative modulator subsystem further includes a phase shift device 55 and a combiner 57. As in the foregoing embodiment, the mixer 54 provides a first stage of modulation in which the carrier is combined with an information signal. Following the mixer 54, the amplifier 56 is connected in parallel with the phase shift device 55. The outputs of the amplifier 56 and the phase shift device 55 are added together by the combiner 57, and the combined signal passes to the amplifier subsystem. Both the amplifier 56 and the phase shift device 55 are controlled by the DSP 32. The phase shift device 55 shifts the phase of the input signal by 180°. During on states of the modulated signal, the amplifier 56 is energized by the DSP to amplify the modulated signal and the phase shift device 55 is shut off. This way, the combined signal that passes through the combiner 57 has passed through two stages of modulation in the same manner as the preceding embodiment. Conversely, during off states of the modulated signal, the amplifier 56 is shut off by the DSP and the phase shift device 55 reverses the phase of the modulated signal. Accordingly, the remaining carrier present in the modulated signal that leaks past the amplifier 56 is added to the inverse of the remaining carrier signal by the combiner 57, to effectively cancel the signal.

It should be appreciated that other active elements can be operated in a similar cascaded manner to further increase the dynamic range of the modulated signal, such as a preamplifier stage. Moreover, a greater number of cascaded stages (e.g., plural amplifier, preamplifier, mixer or switching stages) can also be utilized to achieve further increases in dynamic range, with an associated drawback of increased complexity and part count.

Returning now to FIG. 2, the modulated signal is amplified to a desired level for transmission by the amplifier subsystem. The amplified modulated signal then passes through the circulator 50 to the antenna connection subsystem (described below). Leakage of the transmitted signal into the receiver subsystem is a source of noise, and the amount of such leakage is determined by the quality of the match between the amplifier subsystem and the circulator 50. In order to improve the match between the amplifier subsystem and the circulator 50, two individual power amplifiers and two 90° couplers are combined to create a single high power amplifier that has twice the output power capacity and better matching characteristics than the individual amplifiers.

Figure 5:
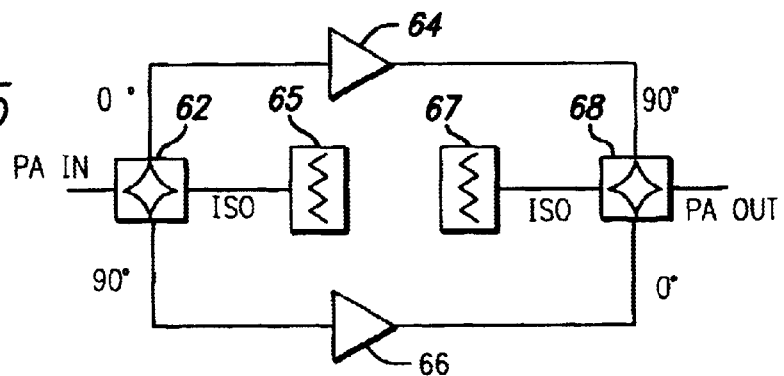
FIG. 5 is a block diagram of an alternative embodiment of the amplifier subsystem.

More particularly, the amplifier subsystem comprises quadrature hybrids 62, 68 and power amplifiers 64, 66. The first quadrature hybrid 62 splits the modulated signal at the input of the amplifier subsystem into two signals differing in phase by 90°. The two signals are coupled into the power amplifiers 64, 66, respectively. The gain of the power amplifiers 64, 66 is controlled by control signals provided by the DSP 32. After being amplified to a desired power level, the amplified signals are recombined by the second quadrature hybrid 68 at the output of the amplifier subsystem. As shown in greater detail in FIG. 5, each one of the quadrature hybrids 62, 68 has an isolated port coupled to a respective resistor termination 65, 67. Reflected power from the power amplifiers 64, 66 in either the forward or reverse directions is coupled through the isolated ports of the quadrature hybrids 62, 68 and into the resistor termination 65, 67 for attenuation. The quadrature combination of the ampified signals serves to reduce even harmonics of the combined signal and improves the return loss of the input and output to the amplifier subsystem.

In an embodiment of the invention, the power amplifiers 64, 66 operate in a saturated gain mode, and in this mode, the output power is determined by the voltage bias on the amplifier. Since the RFID interrogator receives and transmits signals simultaneously, received signals are processed at frequencies that may be slightly offset from the transmitted signal. At very low offset frequencies, amplitude and phase noise from within the radio module 40 of the RFID interrogator may cause noise and/or interference to detecting and receiving signals. Amplitude noise can propagate through the transmitter 40a to the receiver 40b without any attenuation relative to the desired received signal. By placing the power amplifiers 64, 66 in a gain saturated state, the amplitude fluctuations in the transmitted signal are greatly reduced.

Figure 6:
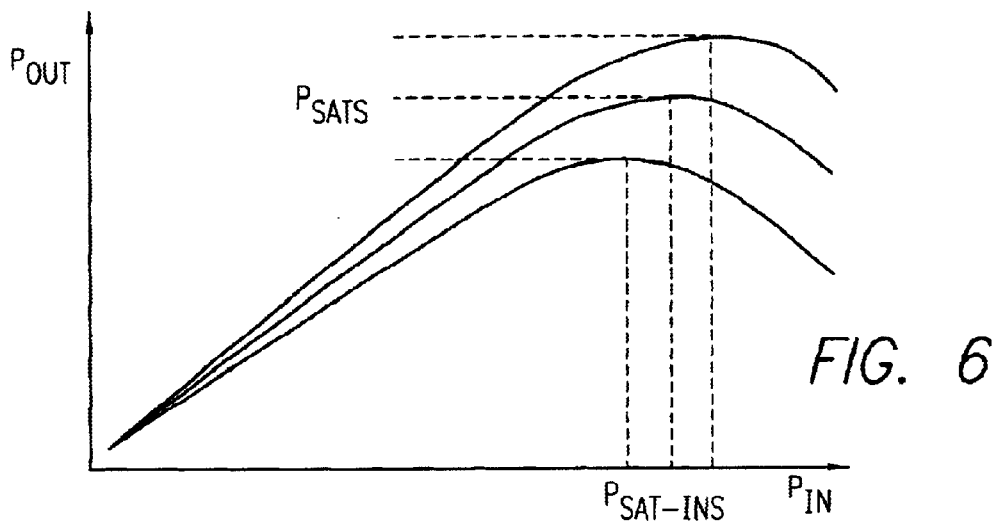
FIG. 6 is a graph illustrating amplifier output power versus input power for three different bias conditions.

Referring now to FIG. 6, a graph illustrating amplifier output power versus input power for three different bias conditions is shown. As known in the art, amplifiers typically operate in a linear region in which the output power is proportional to the input power. The ratio of output power to the input power is referred to as the gain of the amplifier. When the input power increases without bound, the amplifier moves out of the linear region and the output power thereby increases at a smaller rate. As the input power keeps increasing, the output power reaches a maximum level, known as the saturated output power level. Further increases in the input power after the output power has saturated may actually cause a decrease in output power. At the saturated output power level, the amplifier has a differential gain of zero, wherein an infinitesimal change in the input power will not change the output power.

The saturated output power depends on the DC bias conditions on the amplifier, and as the DC voltage supply bias to the power amplifiers 64, 66 increases, the saturated power also increases. The graph of FIG. 6 shows three different saturated power levels for the power amplifiers 64, 66, and it should be appreciated that the input power necessary for saturating the power amplifiers differs for each bias condition. Operating the power amplifiers 64, 66 in the saturated mode is advantageous for two reasons. First, the output power over temperature is extremely stable since the DC voltage regulators effectively control the RF output power in the saturated mode, and the regulators are temperature stabilized. Second, since the saturated mode provides a differential gain of zero, any amplitude fluctuations that would leak into the receiver subsystem and cause interference are virtually eliminated from the amplifier output signal.

Returning again to FIG. 2, the circulator 50 separates and isolates the outgoing transmitted signals and incoming received signals. Transmitted signals pass through a directional coupler 72 to the antenna connection subsystem, which couples the transmitted signals into a selected antenna for transmission to an RFID transponder. The antenna connection subsystem comprises an RF switch 74, low-pass filters 75, 76, and antennas 77, 78. The RF switch 74 is controlled by the DSP 32 to select one of the two antennas 77, 78 for operation. Before the transmitted signals reach the antennas 77, 78, the low-pass filters 75, 76 attenuate the harmonics of the RF fundamental frequency to prevent excessive emissions into FCC restricted frequency bands.

Similarly, received signals pass from the antennas 77, 78 through the directional coupler and the circulator to the receiver subsystem. The receiver subsystem demodulates the received signals and passes the demodulated signals to the DSP 32 for data processing. In a preferred embodiment of the invention, the received signals are demodulated in a homodyne mode and are thereby directly downconverted to baseband without the use of intermediate frequency (IF) demodulation stages. More particularly, the receiver subsystem comprises mixer 82, high-pass filters 84, 86, resistor terminations 85, 87, low-pass filters 92, 94 and low noise amplifiers 93, 95. The mixer 82 has a local oscillator input (L), an RF input (R), and I and Q outputs. The received signal passes through the circulator 50 and is coupled to the RF input R. The carrier passes through the circulator 50 in the opposite direction of the received signal, and is coupled by the directional coupler 72 into the local oscillator input L. The mixer 54 multiplies the carrier with the received RF signal to yield demodulated I and Q signal components. The I and Q signal components pass through the low-pass filters 94, 92 and low noise amplifiers 95, 93, respectively, and are provided to the DSP module 30. Within the DSP module 30, the low-pass filtered I and Q signal components pass through the band-pass filters 39, 37, respectively. The bandwidth of these band-pass filters 39, 37 correspond to the singlesideband bandwidth of the receiver channel bandwidth (e.g., 200 kHz). The outputs of these band-pass filters 39, 37 are then sampled by ADCs 38, 36 and fed into the DSP 32.

The I and Q outputs of the mixer 82 are further coupled to the high-pass filters 86, 84, which are in turn coupled to respective resistor terminations 87, 85. The power from the fundamental carrier frequency and its harmonics are absorbed by the resistor terminations 87, 85, while the low frequency data signals from the RFID transponder are not attenuated. More particularly, the carrier frequency may be expressed as sin ωt, and the received RF signal may be expressed as A(t) sin ωt. The I signal component represents the carrier frequency multiplied with the received RF signal, as follows:

$$I(t) = A(t)\sin^2 \omega t$$

which may be further expressed as:

$$I(t) = \tfrac{1}{2}(A(t)\sin 2\omega t)$$

The first element of the expression, A(t)/2, represents the low frequency portion of the signal component I, and the second element of the expression, ½(A(t) sin 2ωt), represents the high frequency portion of the signal component I. It should be appreciated that the Q signal component is calculated in a similar manner, except that it contains a phase shift of 90°. Thus, the low-pass filters 92, 94 permit the low frequency portion of the signal component to pass to the DSP 32, and the high-pass filters 84, 86 permit the high frequency portion of the signal components to pass to the resistor terminations 85, 87. The resistor terminations 85, 87 attenuate the high frequency portion of the signal components in order to prevent its reflection back to the mixer 82. By absorbing the high frequency power, the receiver subsystem prevents the carrier and its harmonics from mixing together and generating noise or interference at baseband frequencies at which the RFID transponder signals are to be processed.

The proper placement of the reference signal (i.e., carrier) that drives the mixer 82 can minimize and/or eliminate phase noise sources as the predominant source of interference. Ideally, the reference signal should be coupled from a location that is proportional to the leakage into the RF input R of the mixer 82. Accordingly, the directional coupler 72 that provides the reference signal is disposed in close proximity to the source of leakage, as shown in FIG. 2.

Having thus described a preferred embodiment of a system and method for communication with an RFID transponder, it should be apparent to those skilled in the art that certain advantages of the within system have been achieved. It should also be appreciated that various modifications, adaptations, and alternative embodiments thereof may be made within the scope and spirit of the present invention. The invention is further defined by the following claims.

What is claimed is:

1. A communication device, comprising:
   an RF carrier source providing a carrier signal;
   a processor providing an information signal; and
   plural modulation stages coupled to said RF carrier source and adapted to modulate said information signal onto said carrier signal using on/off keying modulation, said plural modulation stages being controlled in unison by control signals from said processor to provide a modulated signal.

2. The communication device of claim 1, wherein at least one of said plural modulation stages comprises a mixer adapted to combine said carrier signal with said information signal to provide said modulated signal having on and off states in correspondence with said information signal.

3. The communication device of claim 1, wherein at least one of said plural modulation stages comprises an amplifier being responsive to said control signals to amplify said carrier signal only during on states of said information signal.

4. The communication device of claim 1, wherein at least one of said plural modulation stages comprises a switch having a first position coupled to a transmission path and a second position not coupled to said transmission path, said switch being responsive to said control signals to couple said modulated signal to said transmission path only during on states of said information signal.

5. The communication device of claim 4, further comprising a resistor termination coupled to said second position of said switch, said modulated signal being coupled to said resistor termination during off states of said information signal.

6. The communication device of claim 1, wherein at least one of said plural modulation stages comprises a phase shift device coupled in parallel with an amplifier, said phase shift device being responsive to said control signals to reverse phase of said modulated signal during off states of said information signal, and further comprises a combiner coupled to said amplifier and said phase shift device for combining signals therefrom, said combiner effectively canceling said modulated signal during said off states of said information signal by combining said phase reversed modulated signal thereto.

7. The communication device of claim 1, wherein said modulated signal comprises dynamic range of greater than 25 dB between respective on and off states thereof.

8. A method for communicating a signal with on/off key modulation, comprising the steps of:
   providing a carrier signal; and
   modulating said carrier signal with an information signal to provide a modulated signal having on and off states in correspondence with said information signal, said modulating step being carried out by plural successive stages in unison.

9. The method of claim 8, wherein the modulating step further comprises the step of coupling said modulated signal to a transmission path only during said on states of said modulated signal.

10. The method of claim 8, wherein the modulating step further comprises the step of amplifying said modulated signal only during said on states of said modulated signal.

11. The method of claim 8, wherein the modulating step further comprises the step of mixing said carrier signal with said information signal.

12. A communication device, comprising:
   an RF carrier source providing a carrier signal;
   a modulator receiving said carrier source and modulating an information signal thereon to provide a modulated RF signal;
   an amplification stage coupled to said modulator, said amplification stage splitting said modulated RF signal into first and second components and amplifying said first and second components separately, said first and second components being thereafter recombined to provide an amplified modulated RF signal; and a receiving stage adapted to receive a backscattered modulated signal from an radio frequency identification (RFID) transponder, wherein said amplification stage is matched to said receiving stage to thereby reduce leakage of said amplified modulated RF signal into said received backscatter modulated signal.

13. The communication device of claim 12, further comprising a circulator adapted to pass said amplified modulated signal in a first direction therethrough for transmission to an RFID transponder and said received backscatter modulated signal from said RFID transponder in a second direction therethrough opposite said first direction.

14. The communication device of claim 12, wherein said amplification stage further comprises a first quadrature hybrid adapted to split said modulated RF signal into said first and second components having a phase difference therebetween.

15. The communication device of claim 12, wherein said amplification stage further comprises first and second power amplifiers receiving said first and second components respectively and providing amplification thereto.

16. The communication device of claim 14, wherein said amplification stage further comprises a second quadrature hybrid adapted to combine said first and second components of said modulated RF signal amplified by said first and second power amplifiers, respectively.

17. The communication device of claim 12, wherein said phase difference further comprises approximately 90°.

18. The communication device of claim 16, wherein said first and second quadrature hybrids further comprise respective isolated signal paths for communicating reflected power from said first and second power amplifiers therefrom.

19. The communication device of claim 18, wherein said amplification stage further comprises resistor terminations coupled to said isolated signal paths.

20. The communication device of claim 15, wherein said first and second power amplifiers are each driven at a saturation level.

21. A communication device, comprising:
an RF carrier source providing a carrier signal;
a modulator receiving said carrier source and modulating an information signal thereon using on/off keying to provide a modulated RF signal; and
an amplification stage coupled to said modulator, said amplification stage being driven at a saturation level to provide an amplified modulated RF signal.

22. The communication device of claim 21, wherein said amplification stage splits said modulated RF signal into first and second components and amplifies said first and second components separately, said first and second components being recombined thereafter.

23. The communication device of claim 22, wherein said amplification stage further comprises a first quadrature hybrid adapted to split said modulated RF signal into said first and second components having a phase difference therebetween.

24. The communication device of claim 23, wherein said amplification stage further comprises first and second power amplifiers receiving said first and second components respectively and providing amplification thereto.

25. The communication device of claim 24, wherein said amplification stage further comprises a second quadrature hybrid adapted to combine said first and second components of said modulated RF signal amplified by said first and second power amplifiers, respectively.

26. The communication device of claim 23, wherein said phase difference further comprises approximately 90°.

27. The communication device of claim 24, wherein said first and second quadrature hybrid further comprises respective isolated signal paths for communicating reflected power from said first and second power amplifiers therefrom.

28. The communication device of claim 27, wherein said amplification stage further comprises resistor terminations coupled to said isolated signal paths.

29. A method for communicating a signal, comprising the steps of:
providing a carrier signal;
modulating an information signal onto said carrier signal using on/off keying to provide a modulated RF signal; and
amplifying said modulated RF signal at a saturation level to reduce amplitude variation of said modulated signal.

30. The method of claim 29, wherein said amplifying step further comprises splitting said modulated RF signal into first and second components and amplifying said first and second components separately.

31. The method of claim 30, further comprising the step of recombining said first and second components after said amplifying step.

32. The method of claim 30, wherein said amplifying step further comprises splitting said modulated RF signal into said first and second components having a phase difference therebetween.

33. The method of claim 32, wherein said phase difference comprises 90°.

34. The method of claim 30, further comprising the step of communicating reflected power produced in said amplifying step to a resistor termination.

35. A device for communicating signals to and from a radio frequency identification (RFID) transponder, comprising:
an RF carrier source providing a carrier signal;
a transmitter adapted to transmit said carrier signal to said RFID transponder at a desired power level;
a demodulator mixing a backscatter modulated signal received from said RFID transponder with said RF carrier to provide a baseband signal; and
an attenuator coupled to said demodulator for absorbing high frequency components of said baseband signal.

36. The communication device of claim 35, wherein said baseband signal further comprises in phase (I) and quadrature phase (Q) components.

37. The communication device of claim 36, wherein said attenuator further comprises a high-pass filter and a resistor termination, said high frequency components of said baseband signal passing through said high-pass filter to said resistor termination.

38. The communication device of claim 37, further comprising a circulator adapted to pass said carrier signal in a first direction therethrough for transmission to said RFID transponder and said backscatter modulated signal in a second direction therethrough opposite said first direction, said circulator being coupled to said demodulator.

39. The communication device of claim 38, further comprising a directional coupler disposed closely adjacent to a final amplification stage of said transmitter, said directional coupler passing said carrier signal to said demodulator.

40. A method for communicating signals to and from a radio frequency identification (RFID) transponder, comprising the steps of:

providing a carrier signal;

transmitting said carrier signal to said RFID transponder at a desired power level;

mixing a backscatter modulated signal received from said RFID transponder with said carrier signal to provide a baseband signal; and absorbing high frequency components of said baseband signal.

41. The method of claim 40, wherein said baseband signal further comprises in phase (I) and quadrature phase (Q) components.

42. The method of claim 40, further comprising the step of passing said carrier signal in a first direction through a circulator and said backscatter modulated signal in a second direction through said circulator opposite said first direction.

* * * * *